NON DESTRUCTIVE READOUT MEMORY CELL

Filed March 22, 1963

WITNESSES:

Bernard R. Gieguez

Leon M. Garman

INVENTOR
Edward R. Higgins

BY Ernest P. Klipfel
ATTORNEY 3,314,054

NON-DESTRUCTIVE READOUT MEMORY CELL

Edward R. Higgins, North Linthicum, Md., assignor to Westinghouse Electric Corporation, Pittsburgh Pa., a corporation of Pennsylvania Filed Mar. 22, 1963, Ser. No. 267,204
1 Claim. (Cl. 340—174)

The present invention relates generally to magnetic devices and more particularly relates to a non-destructive readout memory cell.

Several basic magnetic devices are presently available for use as non-destructive readout memory cells. One such non-destructive readout memory termed a "transfluxer" is a magnetic core made of material having a square loop hysteresis characteristic, and is provided with two or more apertures which divide the core into three or more flux paths. Data is stored in either of two magnetic states in the flux paths. A non-destructive readout of the data stored therein can be had without change in the stored magnetic state. However, transfluxer type cells require two wires to pass through the minor aperture which is extremely small in size. Stored binary information, namely, ONES and ZEROS when readout are of the same sensed polarity and differ primarily in amplitude; the ratio of ONES to ZEROS having amplitude differences which are sometimes difficult to sense. To interrogatae such a cell the interrogate magnetomotive force must reverse polarity during the cycle, which fact results in additional circuit considerations.

Another non-destructive readout memory cell, commonly known as the Biax, while overcoming some of the difficulties of the aforementioned cell is difficult to fabricate due to its physical geometry and the requirement of two holes at right angles to each other within the structure.

Briefly, in accordance with the present invention a magnetic device is provided wherein a core of magnetic material having two remanent states has magnetic flux stored around a first aperture, which flux is modulated by interrogate means threaded through two other apertures inducing a reversible flux change sensed by means threaded through the first aperture. Sensing is accomplished without regard for temperature variations.

An object of the present invention is to provide a magnetic device allowing non-destructive readout of an output signal having a polarity indicative of the direction of the flux stored in said device.

Another object of the present invention is to provide a magnetic device having an output whose polarity is dependent upon the polarity of the stored flux within the device.

Another object of the present invention is to provide a magnetic device having an output polarity independent of the polarity of the interrogate pulse thereby allowing interrogate pulses of either polarity to be used.

Another object of the present invention is to provide a magnetic device having very high speed reading capabilities, is extremely insensitive to temperature changes and is also simple to manufacture.

Another object of the present invention is to provide a magnetic device having bipolar outputs thereby eliminating the necessity of amplitude discrimination to readout the information stored therein.

Another object of the present invention is to provide a non-destructive readout memory cell in which sensing of a ONE or ZERO is effected through polarity discrimination of the readout signal, and the amplitude discrimination is of secondary importance.

Another object of the present invention is to provide a non-destructive readout memory cell wherein the output is approximately directly proportional to the rate of change of the interrogate current.

Another object of the present invention is to provide a magnetic device wherein only one winding is threaded through the small minor apertures with the remaining windings threaded more easily through the major apertures.

A prime object of this invention is to provide a magnetic device having a core utilizing a configuration of apertures wherein the axis of all holes are parallel thereby permitting ease of fabrication.

Further objects and advantages of the present invention will be readily apparent from the following detailed description taken in conjunction with the drawing, in which.

Figure 1:
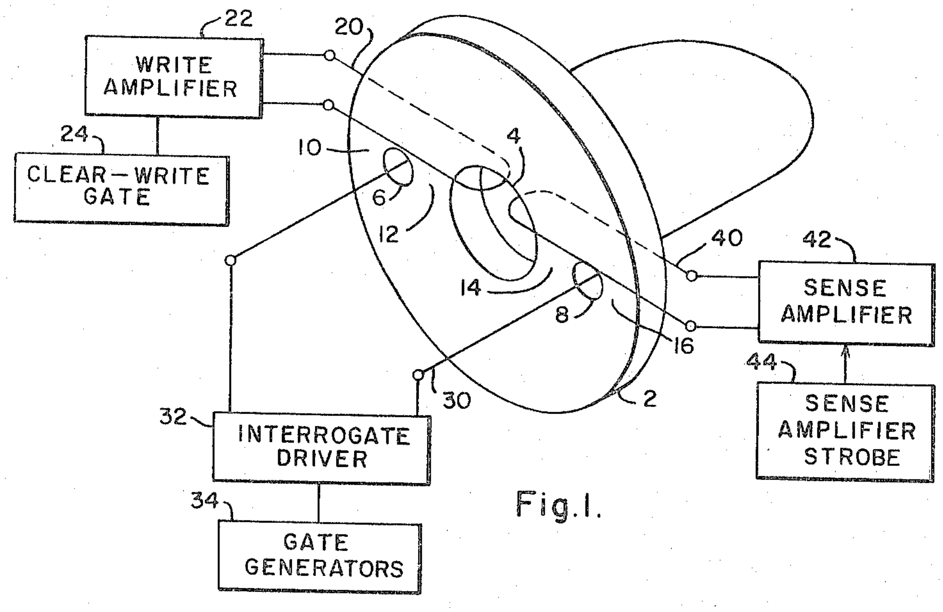
FIGURE 1 is a schematic diagram of an illustrative embodiment of the present invention.

Referring to FIGURE 1, a core 2 of magnetic material having a square loop hysteresis characteristic is provided with a major aperture 4 and two minor apertures 6 and 8. The minor apertures 6 and 8 and the major aperture 4 are disposed through the magnetic material to provide a first leg 10 between the outside diameter of the core 2 and the inside diameter of the minor aperture 6. A second leg 12 is disposed between the major aperture 4 or inside diameter of the core 2 and the inside diameter of the minor aperture 6. In a like manner, third and fourth legs 14 and 16 are formed between the minor aperture 8 and the inside and outside diameters respectively of the core 2.

A write winding 20 is threaded through the major aperture 4 and is connected to a write amplifier 22 for providing excitation to induce magnetic flux to be stored in the core 2. An interrogate winding 30 is threaded through the minor aperture 6 and out of the minor aperture 8. An interrogate driver 32 is connected to provide excitation to the interrogaate winding 30 when the information stored in the core 2 is to be readout. In memory systems the interrogate drive current is usually supplied through a selection matrix which in turn is driven by a number of switches and drivers which are controlled in turn by gate pulses.

A sense winding 40 threaded through the major aperture 4 senses the net flux change induced in the core 2 by energization of the interrogate winding 30 and provides an output signal to a sense amplifier 42 or other utilization device. The output or read signal is usually amplified by the front end of the amplifier 42 then strobed in later stages when the signal to noise ratio on the sense winding 40 is most desirable. Gates 24 and 34 control the drivers which supply excitation to the write and interrogate windings 20 and 30 respectively as required.

Figure 2A:
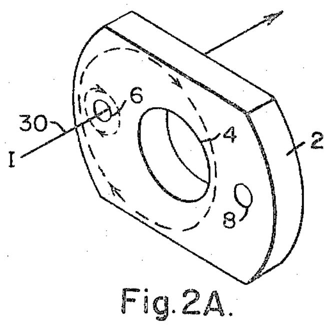
FIGURES 2A–2C and 3A–3G are diagrams illustrating the manner in which my invention obtains the desired results.
Figure 2B:
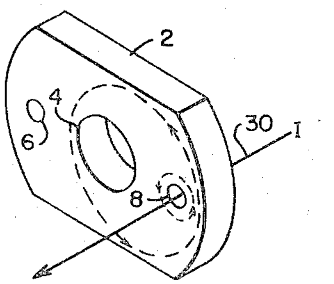
Figure 2C:
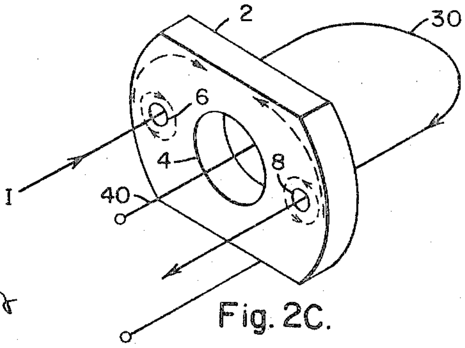

For a clearer understanding of the present invention, initially consider a core 2 having no remanent flux orientation around the major aperture. Reference is made to FIGURE 2A wherein the effect of an excitation or current pulse I in the interrogate winding 30 threaded through the minor aperture 6 will result in a flux pattern around that minor aperture and the major aperture 4 in a direction as indicated by the arrows. FIGURE 2B illustrates this same excitatioin or current through the interrogate winding now returning through the minor aperture 8, thus setting up a flux pattern within the core 2 as illustrated by the arrows. When a current pulse I passes through the interrogate winding 30 it can be seen from FIGURE 2C that the fluxes that tend to loop the major aperture 4 are opposing and cancel each other with the result that, around the major aperture, no flux is changed as a result of the interrogation current I. With no net flux change it is seen in FIGURE 2C there is no voltage induced in the sense winding 40 threaded through the major aperture. It is, therefore, illustrated that with no remanent or stored flux around the major aperture there is no voltage induced in the sense winding on interrogation.

Figure 3A:
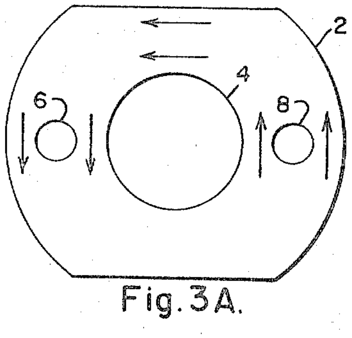
Figure 3B:
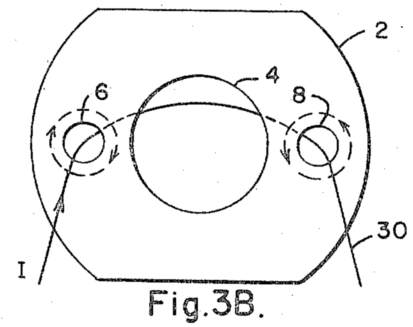
Figure 3C:
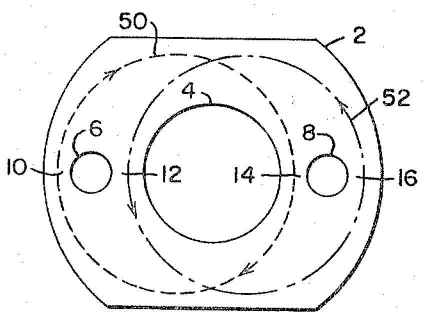
Figure 3D:
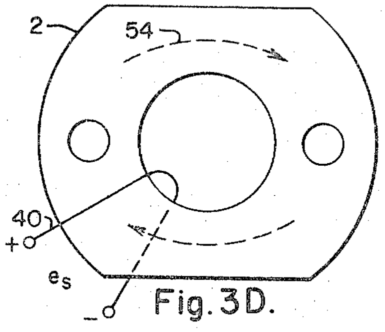

Assume now the remanent flux induced in the core 2 by the write amplifier 22 to be in the direction indicated by the arrows in FIGURE 3A and assume further that the direction of the stored flux is indicative of a binary ONE. A current pulse I on the interrogate winding 30 through the minor apertures 6 and 8 will provide an M.M.F. around the minor apertures as indicated by the arrows in FIGURE 3B. In the legs 10 and 14, FIGURE 3C, where the applied M.M.F. opposes the stored flux, a major flux change results as indicated by the dotted line with a direction as indicated by the arrows. In the legs 12 and 16 the applied M.M.F. resulting from the interrogate winding aids the stored M.M.F. The applied M.M.F. is thus less effective in causing a flux change in these two legs since they are already saturated in the same direction. Accordingly, a dominant flux change path 50 occurs around the major aperture including the magnetic path on one side of each minor aperture and a minor flux change path 52 occurs around the major aperture including the flux path on the other side of each minor aperture. The dominant and minor flux paths oppose each other resulting in a net flux change 54 with a direction as indicated by the arrows, in FIGURE 3D. The resultant net flux change, therefore, induces a voltage in the sense winding 40 in a direction indicated when the interrogate pulse I is rising and results in a voltage pulse in the opposite direction when the current pulse I is diminishing. This is more fully shown by comparing the waveforms of FIGURE 4 wherein the current pulse I in the interrogate winding results in an output pulse $e_{s1}$ in the sense winding when a binary ONE is stored in the core.

It can thus be seen that the net result is a flux change in the direction of the dominating flux change. The overall resultant flux change is sensed by the sense winding 40. The stored remanent flux may appear to decrease as a result of the interrogate current I. However, if the interrogate current causes only a reversible flux change, the stored remanent flux returns to its original value upon removal of the interrogate current.

Figure 5:
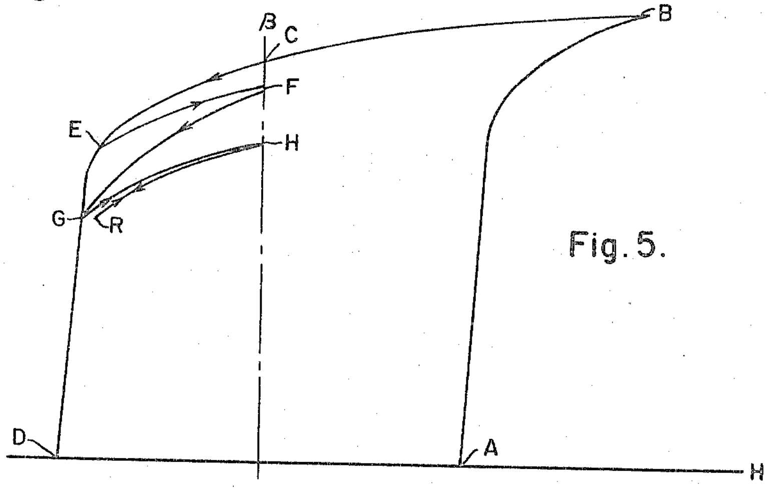
FIGURES 5, 6 and 7 are graphical representations of characteristic curves useful in understanding the present invention.

This is more clearly understood by reference to FIGURE 5 which shows the top half of a hysteresis loop of a typical ferromagnetic material. The flux behavior of the material when subjected to a demagnetizing field is illustrated by the path CEFGHRH. The shape of the path is a function of specific material properties and past history of the core, i.e. the path of the previous hysteresis loops.

The first few interrogate pulses result in a slight decrease in stored flux around the major aperture, as illustrated by the path CEFGH. The amount of permanent reduction of stored flux is again a function of the core geometry, material and interrogate current amplitude. After being interrogated a number of times, a point is reached where the flux change caused by the interrogate current is completely reversible such as path HRH. In typical cases the changes are completely reversible after 3 to 7 interrogate pulses. The fact that the flux change is not completely reversible for the first few interrogate pulses does not significantly influence the operation of the device since the output into the sense line is determined by minor hysteresis loops wherein the flux change is not directly proportional to the level of the stored flux. If the device is driven with large interrogate currents the reduction in magnitude of the stored flux can be very large. In modulator applications this could be a desirable feature. It is not possible to drive the device so hard, reducing the stored flux, that a total loss of stored information results.

Figure 6:
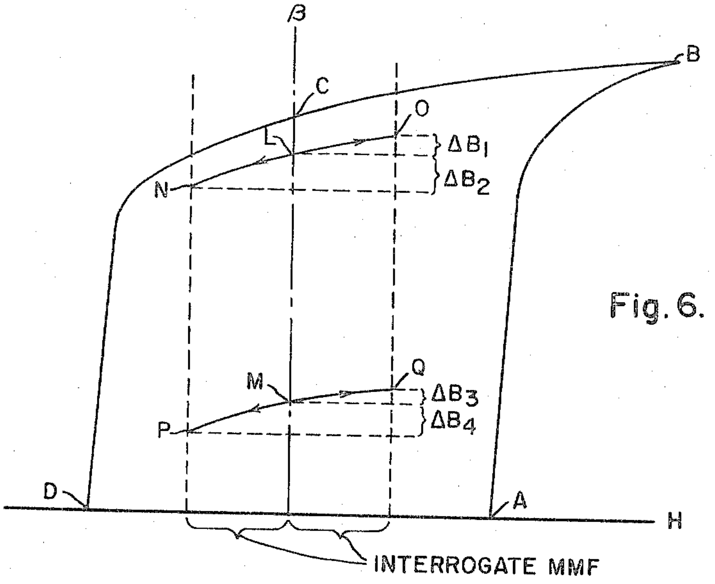

FIGURE 6 indicates the typical behavior of a core after being driven by an infinite number of disturbing magnetizing fields in the directions shown with origins at flux levels L and M. Note that the slope of curve NLO is similar to the slope of curve PMQ. Two curves are illustrated to show that minor hysteresis loops have relatively similar shapes irrespective of flux level. The transient conditions necessary to occur before stabilizing on the curves of FIGURE 6 are not shown as they would obscure the drawing, however, they have the general shape of curve FGHRH of FIGURE 5. It can be observed that regardless of the amount of demagntetizing field applied to the core there is an amount of reversible flux change. Reversible flux change is that flux change resulting when the material after having been subjected to a given magnetizing field is allowed to return to the quiescent level of magnetizing force.

Referring to FIGURES 3A through 3D, when an interrogation pulse I is applied to winding 30, the resulting M.M.F. is applied in such a direction to cause a flux increase in legs 12 and 16. Simultaneously the flux in legs 10 and 14 will decrease. From FIGURE 6 the flux can be considered to change along path LO and LN yielding flux changes $\Delta B_1$ and $\Delta B_2$, respectively. Flux change $\Delta B_2$ can be seen to be the dominant flux change. However, the net flux change as observed by the sense winding 40 is the difference between $\Delta B_1$ and $\Delta B_2$ in the direction of the dominant flux change.

If for some reason a lesser amount of flux is stored in the core, a similar process takes a typical path PMQ yielding flux changes $\Delta B_3$ and $\Delta B_4$. The dominant flux change $\Delta B_4$ is in the same direction as $\Delta B_2$ and the differences between the flux change is similar as when operated along NLO. Thus, it can be seen that the polarity is independent of the amplitude of the stored flux. If the interrogating M.M.F. is reduced, a change in magnitude of the net difference of flux changes occurs but the polarity of the change of the dominating path does not change. The output polarity of the voltage induced in the sense winding 40 is independent of the amplitude of the quiescent flux level.

Figure 3E:
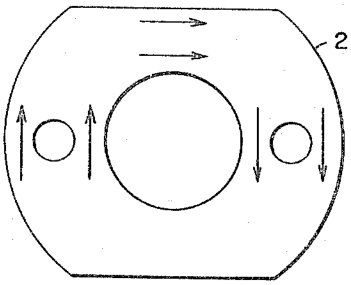
Figure 3F:
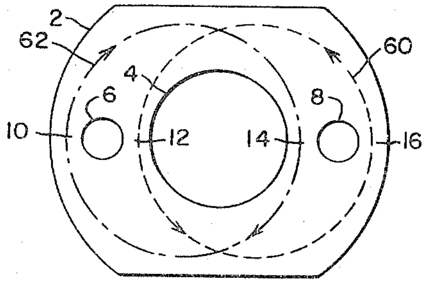
Figure 3G:
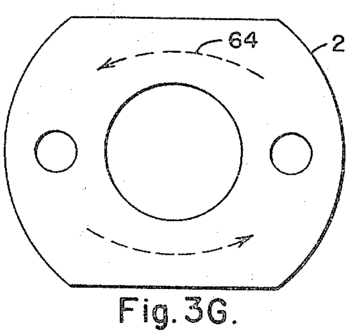
Figure 4:
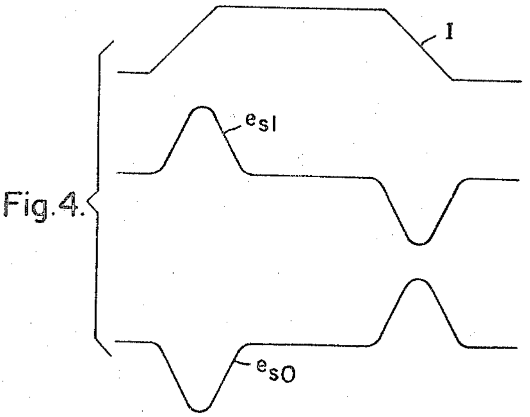
FIGURE 4 is a graphical representation of certain waveforms useful in understanding the illustrations of FIGURES 2A–2C and 3A–3G.

Now, assume the stored remanent flux is in the opposite direction to indicate a binary ZERO stored in the core 2 as indicated by the arrows in FIGURE 3E. A dominant flux change path 60 will now occur around the major aperture including the second and fourth legs 12 and 16, respectively. The minor flux change path 62 having a direction as indicated by the arrows in FIGURE 3F now includes the first and third legs 10 and 14, respectively. The resultant net flux change 64 then is as indicated in FIGURE 3G. As illustrated in FIGURE 4, an interrogate current I will result in an output pulse $e_{s0}$ in the sense winding 40 when the binary ZERO is stored in the core.

It is to be noted that the direction of the interrogate current I through the interrogate winding 30 is of no consequence since the polarity of the output signal induced in the sense winding 40 is solely related to the direction of the remanent flux stored in the core around the major aperture prior to the occurrence of the interrogate pulse. The volt-time integrals observed on the sense winding are the result of a reversible flux change and, therefore, nondestructive sensing is effected. It is desirable to have a fast rising interrogate current pulse I, for the output peak voltage amplitude is a direct function of the rate of change of current in the interrogate line as demonstrated in FIGURE 4.

Figure 7:
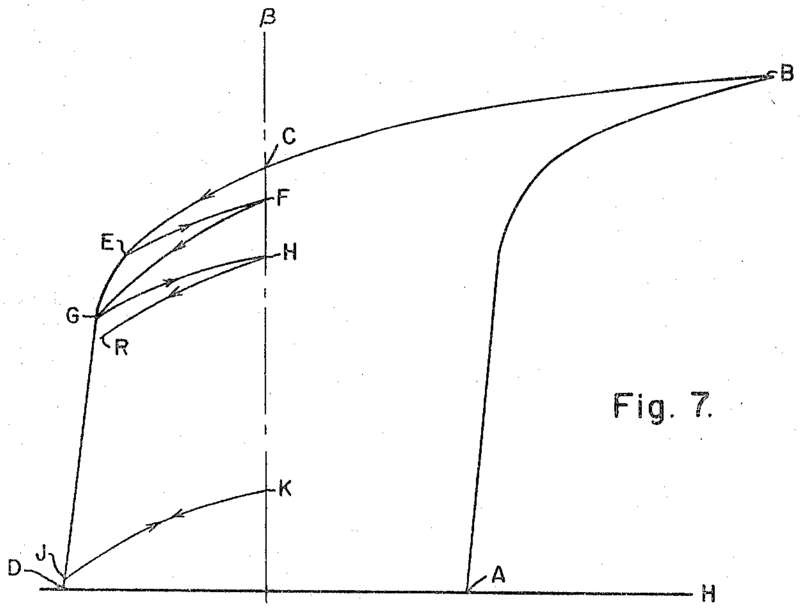

FIGURE 7 shows the top half of a hysteresis loop of the same ferromagnetic material but at higher temperatures. The observable changes are a narrowing of the loop, a reduction in peak flux, and the greater change in flux for a change in magnetizing field H. The slope of the minor hysteresis paths are somewhate steeper but otherwise similar to the behavior shown in FIGURE 5 at lower temperatures. A similar characteristic curve could be shown for lower temperatures wherein a wider, higher and a more square shape hysteresis loop results.

The device of FIGURE 1 has the temperature limitations for writing information into the core 2 as any conventional memory core due to the fact that the width of the characteristic loop varies with temperature. To write into a toroid without disturbing other cores in the array with ordinary coincident current memory techniques the half write currents must not cause the cores to change flux states; yet a coincidence of two half writes must definitely cause a change in flux state. Due to the changes of the threshold current that will cause the flux to change state, operation over reasonable temperature ranges for writing is accomplished only with a reduction in reliability and certainty of operation. Conventional magnetic devices operate on the same principles for both reading and writing. The present invention however senses the direction of the stored flux that was stored by conventional writing techniques. Thus, the device is insensitive for reading information out of the core 2. The stored flux affects the slope characteristics of minor reversible flux changes. Temperature affects the characteristic to some extent, also abnormal interrogate currents may affect the operating point but neither temperature nor abnormal amplitude interrogate currents can change direction of the stored flux which determines the polarity of the output signal. Thus, the device in accordance with the present invention can be read over wide temperature ranges. As the slopes of the reversible flux changes vary with temperature and operating points, the output amplitudes also will vary but a ONE signal will not reverse to become a ZERO.

Figure 8:
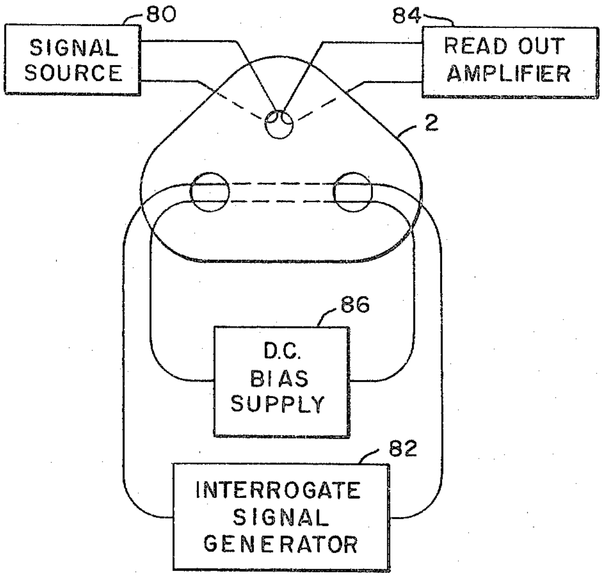
FIGURE 8 is a schematic diagram of another illustrative embodiment of the present invention.

The basic principles of this invention can also be applied to the non-destructive readout of analog information stored as a flux magnitude. Such a circuit is as illustrated in FIGURE 8. The core is not required to be saturated by the remanent flux; the predominating component determines the output polarity. An analog signal input 80 writes a particular level of flux in the core 2 and an interrogate signal generator 82 modulates the analog input signal. The result is a flux change the volt-time integral of which is sensed by the sensing circuit 84. A direct current bias supply 86 for a bias M.M.F. can be added to the interrogate M.M.F. to increase linearity of readout signal.

The inherent property of the device, that an interrogate pulse causes a reduction of flux around the aperture used for writing and sensing lends the device adaptable for use as a high-frequency modulator. The arrangement of components are similar to FIGURE 8. In this device a non-square loop material of suitable characteristics is utilized. Current from the signal source induces flux into the core which is proportional to the signal amplitude. The interrogate current causes a flux change in the core which is also proportional to the flux amplitude caused by the signal source.

The result is an output proportioned to the input signal source at the frequency of the interrogate signal. The phase of the output will be dependent upon polarity of the input signal source; depending upon the polarity of the input signal the phase of the output signal will differ by 180 degrees.

Thus, it is readily apparent that the present invention provides numerous advantages heretofore unattainable. A memory device has been provided with the speed and bipolar output signals of flux interference systems, the low interrogating ampere turns of multiple aperture flux interference devices and the economical fabrication and consistent electrical properties of the "Transfluxor" type geometry.

The core geometry of FIGURE 3 together with presently available 1½ microsecond switching ferrite materials yield devices that can readily be written into with ordinary 2:1 coincident current selection ratios and ordinary memory selection techniques. The present devices use a linear select technique for the interrogate drive, in a 500 word capacity memory.

While a single write winding and write amplifier have been illustrated, it is to be understood that the remanent flux induced into the core may be placed in the desired orientation by conventional coincident current writing techniques well known in the art of digital writing techniques.

A memory cell utilizing the magnetic device of the present invention has the same wiring configuration as a coincident current memory with the addition of the interrogate winding through the minor holes. From a practical standpoint, the larger number of wires are threaded through the larger hole, while the small holes which are admittedly more difficult to string, require only one conductor. However, other geometrical core configurations may be used without departing from the present invention. Each must be approximately symmetrical about a given diametrical axis. That is, one-half of the core is a mirror image of the other half to provide a flux pattern around the aperture through which sensing means is strung.

The device can be designed and operated under conditions that accentuate inherent properties. Non-square loop magnetic materials with high interrogate drives and small sensing holes yield devices that the initial interrogate pulse will cause large non-reversible flux changes around the sensing aperture. Square loop magnetic materials with large sensing apertures and small interrogate drives result in devices where non-reversible flux change caused by interrogation is very small.

While the present invention has been described with a degree of particularity for the purposes of illustration, it is understood that any alterations, modifications or substitutions within the spirit and scope of the present invention are herein meant to be included. For example, it is not necessary that the apertures be circular in shape, the round shape is merely a convenience and makes for less expensive dies. Other shapes such as ellipses and rectangles may be used however these are more difficult to fabricate.

It has been observed that the presence of currents in the interrogate winding during the writing operation influence the writing characteristics when operated in the non-destructive readout memory; it to be understood that the present invention does not include the use of drive currents on the interrogate winding to influence the writing characteristics.

Although the device was described for simplicity as operating without a bias current in the interrogate aperture or apertures wherein the flux around the signal write aperture is caused to decrease with the application of an interrogate current, it is to be understood that if the flux caused by the interrogate winding is in opposition to that resulting from the bias winding, the flux around the write aperture would increase upon application of the interrogate pulse. Also, it is to be understood that the bias current can be superimposed upon the interrogate current thus eliminating the bias winding. Similarly, the sense winding can be shared with the write circuits to eliminate all but one winding in the sensing aperture or apertures.

I claim as my invention:

A non-destructive readout memory cell comprising, in combination; a magnetic core having at least three apertures; means for inducing a remanent flux in one direction within said core around one of said apertures indicative of a binary ONE; means for inducing a remanent flux in the other direction within said core around said one of said apertures indicative of a binary ZERO; means threaded through the other apertures and being the only means so threaded through said other apertures for reversibly altering the remanent flux encircling said one of said apertures; said other apertures being symmetrically disposed on the diametrical axis of said one aperture; and means threaded through said one aperture responsive to said change in remanent flux for providing an output signal having a polarity indicative of the direction of the remanent flux stored in said core.

References Cited by the Examiner

UNITED STATES PATENTS

| | | | |
|---|---|---|---|
| 2,855,586 | 10/1958 | Brown | 340—174 |
| 3,213,434 | 10/1965 | Russell | 340—174 |
| 3,245,049 | 4/1966 | Eiseman | 340—174 |

References Cited by the Applicant

UNITED STATES PATENTS

| | | |
|---|---|---|
| 2,992,415 | 7/1961 | Bauer. |
| 3,071,754 | 1/1963 | Rajchman. |
| 3,093,817 | 6/1963 | Rajchman. |

OTHER REFERENCES

1955 Western Joint Computer Conference, article entitled "A New Nondestructive Read or Magnetic Core," by R. Thorensen and W. R. Arsenault, pages 111–116.

AIEE Transactions, vol. 72, 1953 (1–1954), "Nondestructive Sensing of Magnetic Cores," by D. A. Buck and W. I. Frank, pages 822–830.

Proceedings of the IRE, vol. 49, No. 1, January 1961, "Computer Memories," by J. A. Rajchman, pages 107–117.

BERNARD KONICK, *Primary Examiner.*

S. M. URYNOWICZ, *Assistant Examiner.*